STRESS SENSITIVITY REDUCTION OF MAGNETOSTRICTIVE FILM ELEMENTS

Filed July 28, 1967

INVENTORS
MARVIN R. ROOT
CHARLES H. TOLMAN
BY Thomas J Nikolai
ATTORNEYS 3,573,127

STRESS SENSITIVITY REDUCTION OF MAGNETOSTRICTIVE FILM ELEMENTS

Marvin R. Root, St. Paul, and Charles H. Tolman, Bloomington, Minn., assignors to Sperry Rand Corporation, New York, N.Y.

Filed July 28, 1967, Ser. No. 656,912
Int. Cl. H01f 1/37
U.S. Cl. 156—278 4 Claims

ABSTRACT OF THE DISCLOSURE

The stress sensitivity reduction of thin ferromagnetic film memory elements having magnetostriction by locating the memory elements in the neutral stress surface of a sandwiched planar structure.

BACKGROUND OF THE INVENTION

The present invention relates to thin ferromagnetic film elements such as fabricated in accordance with the S. M. Rubens Pat. No. 2,900,282 and fabricated in two-dimensional arrays such as disclosed in the S. M. Rubens et al. Pats Nos. 3,030,612 and 3,155,561. Such thin ferromagnetic film elements are generally fabricated of a magnetizable material such as Permalloy of 81.5% Ni–18.5% Fe, as discussed in the above mentioned S. M. Rubens Pat No. 2,900,282.

Memory elements of thin ferromagnetic film layers such as those fabricated in accordance with the S. M. Rubens Pat. No. 2,900,282 are utilized in memory systems incorporated in high-speed, random-access memories of electronic data processing systems. Such film elements are most practical and operate most rapidly with small losses when their magnetostriction is negligible and preferably equal to zero. In the fabrication of deposited layer alloy film elements, such as the above referenced 81.5% Ni–18.5% Fe alloy, large quantity production facilities generally provide lower than desirable percentages of useful yields due to such layers having a magnetostrictive coefficient other than zero.

A bistale memory element that may be produced by and utilized with the above referenced Rubens patents may consist of a thin vacuum-deposited film of approximately 81.5% Ni–18.5% Fe alloy of approximately 15 mils in diameter and approximately 100 angstroms (A.) to 3,000 angstroms in thickness, having rectangular hysteresis characteristics and the magnetic characteristic of unaxial ansiotropy providing a preferred, or easy, axis of remanent magnetization. It is known that the magnetic properties of such thin ferromagnetic films are the function of many variables including the intensity and angle of the orienting magnetic field during the deposition, the rate of melt evaporation, and material composition.

The Permalloy input that is melted and evaporated through a mask on a substrate as disclosed in the aforementioned Rubens Pat. No. 2,900,282 has an approximate composition as discussed above of 81.5% Ni–18.5% Fe. As the average material composition of the film depends on the temperature of the melt during deposition, and as the rate of evaporation of the melt increases approximately one order of magnitude for each 100° C. (centigrade) increase in melt temperature during evaporation, the material composition is a sensitive function of melt temperature. As the rates of evaporation for Ni–Fe do not have a corresponding variation with the change in the melt temperature, i.e., a higher melt temperature will cause a greater concentration or Ni to be deposited while the lower melt temperature will cause a greater concentration of Fe to be deposited (ignoring material depletion), by maintaining the desired rate of evaporation, i.e., by varying heat power input, a Permalloy film possessing the desired Ni–Fe composition, i.e., a magnetostrictive coefficient of zero (in this case approximately 81.5% Ni–18.5% Fe) may be deposited on a substrate. The pattern of deposited layer elements, or cores, on a substrate is, as before, determined by the shape of the mask. The thickness of the cores is determined by the length of time the controlling shutters are open, and the material composition of the cores is determined by the melt temperature, the material composition of the melt and the duration, or time, of deposition or generation thereof.

Thin ferromagnetic films of Permalloy material may, or may not, possess the property of magnetostriction. Thin ferromagnetic film elements having a magnetostriction coefficient substantially differing from zero, when subjected to a stress, undergo deleterious magnetic effects causing such ferromagnetic film elements to be unsatisfactory as memory devices for electronic data processing systems. Generally then, it is desirable to provide such thin ferromagnetic film memory elements having zero magnetostriction whereby applied stresses due to the external environment thereof may not adversely effect the operating characteristics of such memory elements.

A device for and a method of monitoring the varying magnetostrictive characteristics of a deposited-layer element during the generation thereof so as to achieve a thin ferromagnetic film memory element having negligible or zero magnetostriction is disclosed in the P. E. Oberg et al. application Ser. No. 332,220, filed Dec. 20, 1963, now Pat. No. 3,336,154. This method utilizes a specially developed test apparatus that is placed in the environment in which the deposited-layer elements are to be generated. The vaporized material is deposited on a test substrate member held in the test apparatus in the same manner as it is deposited on the production substrates. A test film, of the same material as the production run elements, is deposited on the test substrate member which is clamped between two opposing, convex surfaced, supporting members. The test substrate member is held on its opposite ends by a pair of clamps that are driven by a cam, cam-follower, and rocker-arm arrangement. This arrangement cyclically flexes the test substrate member as it alternately pulls up on and pushes down on the test substrate member ends. This flexing of the test substrate member induces alternate tensile and compressive stresses into the test film while it is being deposited on the bottom surface of the test substrate member. The switching field generated by the test film's magnetization is detected by a pick-up coil mounted in a superposed relationship above the test film whereby there is generated in the pick-up coil a test signal indicative of the switching field's characteristic. The test signal is monitored and analyzed whereby the generation of the deposited-layer elements is controlled so as to achieve a finished product having the desired, or zero, magnetostriction.

Notwithstanding the successful operation of the above discussed method of monitoring, and thus controlling, the magnetostriction of thin-ferromagnetic film elements during their generation in an evacuatable enclosure it is desireable to provide a means whereby such film elements that have other than the desired zero magnetostrictive coefficient may be utilized in memory systems. It is possible to isolate the deposited-layer elements from environmentally induced stresses that adversely affect the ability of the memory elements to function within the operating limits of signal intensity, shock, and vibration. The present invention is directed towards a means of utilizing deposited-layer elements whose magnetostrictive characteristics would otherwise preclude their use in memory systems of electronic data processing systems.

SUMMARY OF THE INVENTION

The present invention involves a method of reducing the adverse effects of environmental conditions upon the thin ferromagnetic film memory elements of an electronic data processing system. The invention involves the location, i.e., the placing of such thin ferromagnetic film elements in the neutral stress surface of a planar structure formed by the two-dimensional array of such thin ferromagnetic film elements. As the stress in the neutral surface of a structural member is zero, even under the application of severe cyclic stresses, thin ferromagnetic film elements located therein undergo no adverse effects to their memory capability even though such thin ferromagnetic film elements may possess greater than normally desirable magnetostriction. See the text "Engineering Mechanics of Deformable Bodies," E. F. Byars and R. D. Snyder, International Textbook Co., Scranton, Pa., 1963. Accordingly, it is an object of the present invention to provide for the reduction of adverse stress effects of magnetostriction upon bistable memory elements.

DESCRIPTION OF THE PREFERRED EMBODIMENTS

Figure 1:
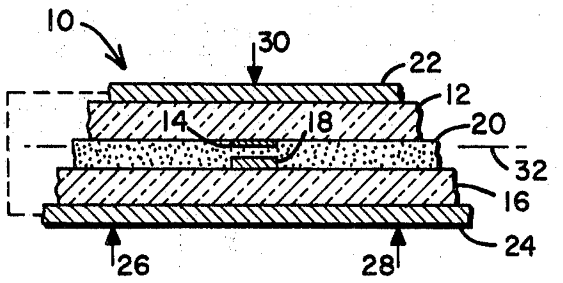
FIG. 1 is a diagrammatic illustration of a side view of a first embodiment of the present invention.

With particular reference to FIG. 1 there is presented a diagrammatic illustration of a side view of a first embodiment of the present invention. In this embodiment memory device 10 includes a glass substrate 12 of 0.003 inch in thickness upon which is deposited a thin ferromagnetic film element 14 of approximately 2,000 angstroms in thickness and of a material composition of approximately 81.5% Ni–18.5% Fe having a diameter of approximately 15 mils. Next, there is provided glass substrate 16 of approximately 0.003 inch in thickness upon which is formed, by an well known means, a copper sense line of approximately 20,000 angstroms in thickness and of approximately the same width as the diameter of element 14. Substrates 12 and 16 are oriented with element 14 and line 18, respectively, in a superposed relationship with a bonding material 20 such as Eastman 910 adhesive sprayed or brushed upon the opposing surfaces of substrates 12 and 16 whereby such substrates are caused to form a compact, sandwiched structure having a layer 20 of approximately 0.0004 inch between element 14 and line 18. Lastly, copper drive lines 22 and 24 are oriented in a superposed relationship upon substrates 12 and 16, respectively, sandwiching element 14 therebetween and typically oriented orthogonal to the enveloped sense line 18. Considering the above dimensions it is to be appreciated that the illustrated embodiments are of a schematic nature only with no attempt being made to depict relative dimensions.

Figure 2:
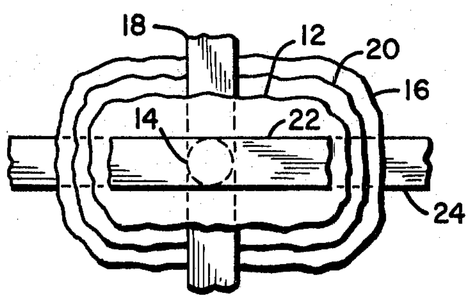
FIG. 2 is an illustration of a plan view of the embodiment of FIG. 1.

With particular reference to FIG. 2 there is presented an illustration of a plan view of an embodiment of FIG. 1. This diagrammatic illustration of the embodiment of FIG. 1 is presented particularly to orient the drive lines 22 and 24 and the sense line 18 with the memory element 14. With reference back to FIG. 1 it can be seen that the neutral stress surface 32, midway between the outside surfaces of lines 22 and 24, lies approximately in the plane of memory element 14. Thus, forces applied at points 26, 28 on the lower surface of memory device 10 and at point 30 on the upper surface of memory device 10 would produce a concave distortion of memory device 10 inducing a compressive stress on the upper fibers of memory device 10 and tensile stress in the lower fibers of memory device 10. However, with memory element 14 being situated in the neutral stress surface 32 of memory device 10 stresses in element 14 would by substantially zero. Thus, with no stresses applied to memory element 14 no adverse effects in its bistable memory characteristics would be produced.

Figure 3:
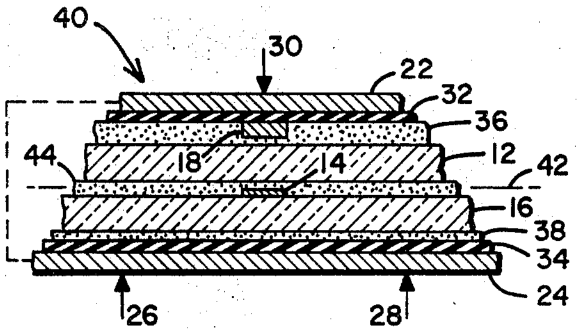
FIG. 3 is a diagrammatic illustration of a side view of a second embodiment of the present invention.

With particular reference to FIG. 3 there is presented a diagrammatic illustration of a side view of a second embodiment of the present invention. This second embodiment, wherein like component parts of the embodiment of FIG. 1 have like reference members, is substantially similar to the embodiment of FIG. 1 except that the sense line 18 is situated outside of the sandwiched arrangement of substrates 12 and 16, memory element 14 and adhesive layer 44. In this arrangement lines 18 and 22 may be formed upon a Mylar substrate 32 of approximately 0.003 inch in thickness with the printed circuit arrangement formed thereby bonded to the upper surface of substrate 12 by an adhesive 36. In like manner line 24 may be formed upon a Mylar substrate 34 which in turn is bonded upon the bottom surface of substrate 16 by an adhesive 38. In this arrangement, assuming that the principal structural rigidity of memory device 40 is provided by substrates 12 and 16, it can be seen that the neutral surface 42 is substantially coextensive with the plane of memory element 14 providing an optimum configuration of minimum stress induced deficiencies in the operating characteristics of memory element 14.

Figure 4:
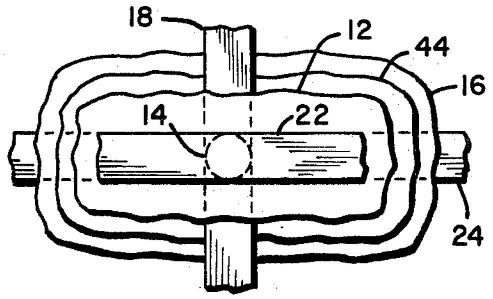
FIG. 4 is an illustration of a plan view of the embodiment of FIG. 3.

With particular reference to FIG. 4 there is presented a diagrammatic illustration of a plan view of the embodiment of FIG. 3 for the principal purpose of orienting drive lines 22 and 24, and sense line 18 with memory element 14.

With particular reference to FIG. 4 there is presented a diagrammatic illustration of a side view of a third embodiment of the present invention. Memory device 50 of this embodiment includes a Mated-Film element such as disclosed in the copending patent application of K. H. Mulholland Ser. No. 498,743, filed Oct. 20, 1965, assigned to the Sperry Rand Corporation as is the present invention, and now abandoned. The Mated-Film memory element includes two superimposed thin ferromagnetic film layers 54 and 56 enveloping a copper diggit sense line 58, having an overall thickness of approximately 0.00013 inch, all of which are vapor deposited upon substrate 16 in a continuous series of vapor deposition steps such as disclosed in the above referenced S. M. Rubens et al. Pat. No. 3,155,561. Substrates 12 and 16 are formed into a unitary sandwiched member by the application of adhesive layer 60 where in layer 56 and substrate 12 are preferably separated by a layer of adhesive 54 of approximately 0.0004 inch in thickness. As discussed with particular reference to FIGS. 1 and 3 similar component parts thereof have been assigned like reference numbers. As previously discussed with particular reference to the above noted embodiments, line 22 and its Mylar substrate 32 are bonded to the top surface of substrate 12 by a suitable adhesive 62 and line 24 and its Mylar substrate 34 are bonded to the bottom surface of substrate 16 by a suitable adhesive 38. As can be seen, the sandwiched array forming memory device 50 provides a planar structure in which the planes of layers 54, 56 are substantially in the neutral stress surface 64 whereby the application of deforming forces upon points 26, 28 and 30 induce minimum stress-produced memory operating deficiencies in the sandwiched Mated-Film element.

Figure 5:
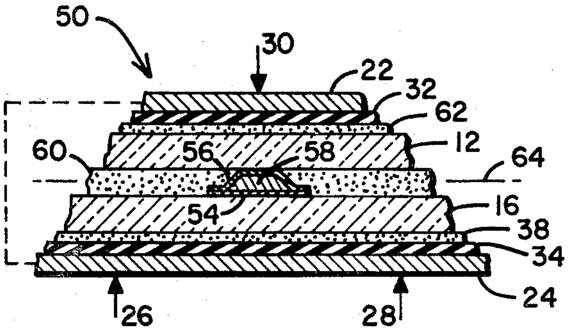
FIG. 5 is a diagrammatic illustration of a side view of a third embodiment of the present invention.
Figure 6:
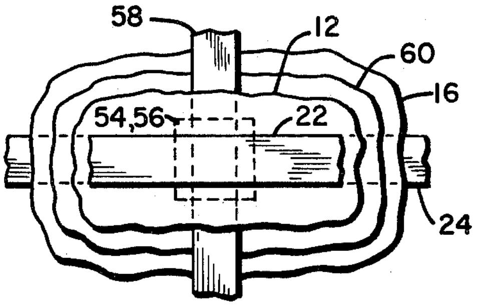
FIG. 6 is an illustration of a plan view of the embodiment of FIG. 5.

With particular reference to FIG. 6 there is presented a diagrammatic illustration of a plan view of the embodiment of FIG. 5. FIG. 6 is particularly presented to illustrate the orientation of the drive lines 22 and 24, and sense line 58 with the thin ferromagnetic film layers 54 and 56.

As the present invention is concerned with the location of thin ferromagnetic film layers in the neutral stress surface of a structural member it is apparent that the principal structural rigidity-contributing members may be of differing thicknesses and of differing material compositions with differing moduli of elasticity. As an example, with particular reference to the embodiment of FIG. 3 it is well known that it is desirable to have a minimum separation between the sense line 18 and the associated memory element 14. Accordingly, substrate 12 could be of a different thickness but of a compensating modulus of elasticity compared to that of substrate 16 whereby sense line 18 could be closer to memory element 14 if substrate 12 were of a lesser thickness but of a greater modulus of elasticity compared to that of substrate 16. If thicker copper lines are required for reasons of current-carrying capacity, as in the embodiment of FIG. 1, the arrangement may utilize substrates of differing thickness and moduli of elasticity to ensure that memory element 14 may be located in the neutral stress surface of the so formed structural member.

Thus, it is apparent that there has been described and illustrated herein a preferred embodiment of the present invention that provides for the substantial reduction of the deleterious effects upon the operating characteristics of a thin ferromagnetc film memory element when subjected to environmental stress. As an example of the above, in one arrangement, such as disclosed in FIG. 3 (wherein substrates 12 and 16, with memory element 14 vapor deposited thereon, were formed into a unitary structure by the bonding together by the application of an adhesion layer 44) the application of forces at points 26, 28 and 30 inducing a cyclical stress in memory element 14 produced a reduction of the stress sensitivity of memory element 14 by a factor of 20 as compared to the application of like forces upon a memory device composed of substrate 16 and memory element 14 deposited thereon. Although the present invention does not reduce the magnetostrictive coefficient of the affected memory elements the present invention does reduce the stress applied to the memory elements and the resulting strain whereby memory elements of greater magnetostrictive coefficients than previously permitted may be utilized in production memories. It is understood that suitable modifications may be made in the structure as disclosed provided that such modifications come within the spirit and scope of the appended claims.

Having now fully illustrated and described our invention what we claim to be new and desire to protect by Letters Patent is set forth in the appended claims.

1. The method of reducing the adverse effects of environmentally applied stresses upon the operating characteristics of a magnetic memory device including a magnetic layer having a magnetostrictive coefficient substantially other than zero, comprising:

forming said memory device of a structural member including, locating and bonding said magnetic layer in the neutral stress surface of said structural member.

2. The method of claim 1 including:

forming said structural member by bonding together two planar substrates; and, locating said magnetic layer between said two planar substrates.

3. The method of claim 1 including locating said neutral stress surface substantially midway between the outside surfaces of said structural member.

4. The method of claim 1 including locating said neutral stress surface substantially away from midway between the outside surfaces of said structural member.

References Cited

UNITED STATES PATENTS 3,155,561 11/1964 Rubens et al. -------- 156—278

BENJAMIN R. PADGETT, Primary Examiner

U.S. Cl. X.R.

117—229; 156—60; 252—62.51; 340—174